United States Patent
Ahrabian et al.

(10) Patent No.: US 12,535,322 B2
(45) Date of Patent: Jan. 27, 2026

(54) SYSTEM AND METHODS OF VEHICLE POSE ESTIMATION

(71) Applicant: HITACHI ASTEMO, LTD., Hitachinaka (JP)

(72) Inventors: Alireza Ahrabian, London (GB); Ioannis Souflas, London (GB)

(73) Assignee: HITACHI ASTEMO, LTD., Hitachinaka (JP)

( * ) Notice: Subject to any disclaimer, the term of this patent is extended or adjusted under 35 U.S.C. 154(b) by 116 days.

(21) Appl. No.: 18/567,517

(22) PCT Filed: Feb. 21, 2022

(86) PCT No.: PCT/JP2022/006806
§ 371 (c)(1),
(2) Date: Dec. 6, 2023

(87) PCT Pub. No.: WO2023/017624
PCT Pub. Date: Feb. 16, 2023

(65) Prior Publication Data
US 2024/0271941 A1    Aug. 15, 2024

(30) Foreign Application Priority Data
Aug. 11, 2021  (EP) .................................. 21386050

(51) Int. Cl.
*G01C 21/16*  (2006.01)
*G01C 21/28*  (2006.01)

(52) U.S. Cl.
CPC ......... *G01C 21/1656* (2020.08); *G01C 21/28* (2013.01)

(58) Field of Classification Search
CPC ............................ G01C 21/28; G01C 21/1656
See application file for complete search history.

(56) References Cited

U.S. PATENT DOCUMENTS 10,325,411 B1 * 6/2019 Laney .................... G01C 21/20
10,390,003 B1   8/2019 Liu et al.
(Continued)

FOREIGN PATENT DOCUMENTS

WO   WO-2021/150779 A1   7/2021

OTHER PUBLICATIONS

International Search Report and Written Opinion of International Patent Application No. PCT/JP2022/006806 dated Apr. 26, 2022 (6 pages).
(Continued)

*Primary Examiner* — Jess Whittington
(74) *Attorney, Agent, or Firm* — Foley & Lardner LLP

(57) ABSTRACT

This invention refers to vehicle (10) comprising an inertial measurement unit (26) configured to output inertial related data, a wheel odometry unit (28) configured to output position related data, an electromagnetic sensor unit (20) configured to output first image data and second image data that is previous image data of the first image data, and a visual odometry part (31) configured to receive the inertial related data, the position related data, the first image data, and the second image data and to output an estimated pose of the vehicle (10) computed by associating a first feature point extracted from the first image data with a second feature point extracted from the second image data and evaluating the association of first feature point and second feature point based on the inertial related data from the inertial measurement unit (26) and the position related data from wheel odometry.

12 Claims, 5 Drawing Sheets

(56) References Cited

U.S. PATENT DOCUMENTS

| | | | |
|---|---|---|---|
| 11,069,071 B1* | 7/2021 | Devitt | G06T 7/11 |
| 11,747,144 B2* | 9/2023 | Li | G01C 21/188 |
| | | | 701/469 |
| 2018/0047147 A1* | 2/2018 | Viswanathan | G06T 7/246 |
| 2019/0368879 A1 | 12/2019 | Roumeliotis et al. | |
| 2020/0025570 A1* | 1/2020 | Li | G06T 7/246 |
| 2020/0081134 A1 | 3/2020 | Wheeler et al. | |
| 2020/0103664 A1 | 4/2020 | Jung et al. | |

OTHER PUBLICATIONS

Partial European Search Report issued in corresponding European Patent Application No. 21386050.5, dated Feb. 7, 2022 (13 pages).

* cited by examiner

SYSTEM AND METHODS OF VEHICLE POSE ESTIMATION

TECHNICAL FIELD

The invention refers a drive device for automated driving and/or assisted driving of a vehicle comprising a first input port configured to receive inertial related data measured by an inertial measurement unit, a second input port configured to receive position related data measured by a wheel odometry unit, and a third input port configured to receive first image data and second image data.

The invention further relates to a vehicle comprising an inertial measurement unit configured to output inertial related data, a wheel odometry unit configured to output position related data, and an electromagnetic sensor unit configured to output first image data and second image data that is previous image data of the first image data.

The invention also refers to a computer-implemented method for driving a vehicle in an automated mode and/or driving assistance mode comprising the steps of: outputting inertial related data by an inertial measurement unit, outputting position related data by a wheel odometry unit, and outputting first image data and second image data by an electromagnetic sensor unit.

Vehicles operating in an autonomous mode (e.g., driverless) or semi-autonomous mode (using driving assistance) free the driver from some driving-related tasks. When operating in an autonomous mode, the vehicle can navigate to various locations, allowing the vehicle to travel with minimal human interaction or in some cases without any passengers. Similarly, in an assisted driving mode, some tasks of the driver are executed by (advanced) driver-assistance systems.

Vehicle localization is the position (and orientation) of the vehicle on earth. Accurate vehicle localization is an important component for autonomous vehicles. Conventional vehicle localization systems rely primarily on GPS (Global Positioning System), where the vehicle has a clear line of sight to multiple GPS satellites. However, GPS tends to fail in tunnels, urban scenarios with skyscrapers etc, because of limited to no line of sight between satellite and vehicle.

US 2020/103664 A1 refers to a method and apparatus for outputting pose information. US 2020/081134 A1 describes validation of global navigation satellite system location data with other sensor data. US 2019/368879 A1 refers to a vision-aided inertial navigation system for ground vehicles localization.

CITATION LIST

Patent Literature

{PTL 1}
US 2020/103664 A1
{PTL 2}
US 2020/081134 A1
{PTL 3}
US 2019/368879 A1

SUMMARY OF INVENTION

Technical Problem

An objective of the invention is to provide a drive device, a vehicle, and computer-implemented method for providing a more accurate and more robust estimation of pose (e.g. the position and orientation).

Solution to Problem

This objective is solved by the subject matter of the independent claims. The dependent claims describe preferred embodiments of the invention.

A drive device for automated driving and/or assisted driving of a vehicle comprises a first input port, a second input port, a third input port, and a visual odometry part. The first input port is configured to receive inertial related data measured by an inertial measurement unit. The second input port is configured to receive position related data measured by a wheel odometry unit. The third input port is configured to receive first image data and second image data by an electromagnetic sensor unit, the second image data being previous image data of the first image data. The visual odometry part is configured to receive the inertial related data, the position related data, the first image data, and the second image data and to output an estimated pose of the vehicle computed by associating a first feature point extracted from the first image data with a second feature point extracted from the second image data and evaluating the association of first feature point and second feature point based on the inertial related data from the inertial measurement unit and the position related data from wheel odometry.

Optionally, the drive device may include a control part configured to generate driving signals for automated driving and/or assisted driving based on the estimated pose.

A vehicle comprises an inertial measurement unit configured to output inertial related data, a wheel odometry unit configured to output position related data, an electromagnetic sensor unit configured to output first image data and second image data that is previous image data of the first image data, and a visual odometry part. The visual odometry part is configured to receive the inertial related data, the position related data, the first image data, and the second image data and to output an estimated pose of the vehicle computed by associating a first feature point extracted from the first image data with a second feature point extracted from the second image data and evaluating the association of first feature point and second feature point based on the inertial related data from the inertial measurement unit and the position related data from wheel odometry.

Optionally, the vehicle may include a control part configured to drive the vehicle in an automated driving mode and/or assisted driving mode based on the estimated pose.

The invention is based on the general idea to combine multiple sensors that estimate vehicle pose to get a more accurate, more robust, and/or more reliable vehicle pose. The invention uses information on the estimated pose of the vehicle received from the inertial measurement unit and the wheel odometry unit to make a determination of the pose of the vehicle based on visual odometry more accurate and/or more robust. Therefore, the pose of the vehicle is determined on a broader base of information. In addition, the calculation of the pose based on the inertial related data and/or the position related data can be more accurate than the estimated pose determined using the image data. Thus, the higher accuracy of the inertial related data and/or the position related data can be used to increase the accuracy of the estimated pose determined using the image data.

The vehicle and/or the drive device for the vehicle may be an autonomous or self-driving vehicle which is sometimes called a robo-car. Alternatively or additionally, the vehicle and/or the drive device may be a semi-autonomous vehicle. Thus, the drive device may be considered a controller of an advanced driver-assistance system. Autonomous vehicles may be considered level 4 or level 5 and semi-autonomous or assisted driving vehicles may be considered level 1 to level 3 according to a classification system with six levels as published in 2021 by SAE International, an automotive standardization body, as J3016_202104, *Taxonomy and Definitions for Terms Related to Driving Automation Systems for On-Road Motor Vehicles.*

The visual odometry part and/or the control part may be part of a computer or processor which performs the tasks outlined below. The computer can include the necessary hardware (e.g., processor(s), memory, storage) and software (e.g., operating system, programs) to execute the tasks outlined below. The tasks executed by the visual odometry part may be stored as algorithms and/or other forms of computer code on a storage device.

The storage device may include one or more memories which can be implemented via multiple memory devices to provide for a given amount of memory. The storage device may include one or more volatile storage (or memory) devices such as random-access memory (RAM), dynamic RAM (DRAM), synchronous DRAM (SDRAM), static RAM (SRAM), or other types of storage devices. The storage device may also include a solid-state device (SSD). However in other embodiments, the storage device may include a hard disk drive (HDD) with or without a smaller amount of SSD storage to act as an SSD cache to enable non-volatile storage of context state and other such information during power down events so that a fast power up can occur on re-initiation of system activities.

The algorithms stored on the storage device can be periodically or intermittently updated. To this end, the storage device may be electronically and/communicatively connected or coupled to a communication part which allows wired or wireless communication with a network and, thus, with servers, other types of storage devices external to the vehicle or the drive device, and/or to other vehicles.

The communication part may be considered a network interface device which can include a wireless transceiver and/or a network interface card (NIC). The wireless transceiver may be a WiFi transceiver, an infrared transceiver, a Bluetooth transceiver, a WiMax transceiver, a wireless cellular telephony transceiver, or other radio frequency (RF) transceivers, or a combination thereof.

The inertial measurement unit is a device for measuring forces to which the inertial measurement unit is subjected, such as acceleration, rotation, yaw, and/or changes in the velocity. The inertial measurement unit may be fixedly attached to the vehicle and/or the drive device. If so, the inertial measurement unit is configured to measure accelerations and/or changes in the velocity of the vehicle and/or the drive device.

The inertial measurement unit may include one or more sensors, such as an accelerometer, a gyroscope (gyrometer), and/or a magnetometer. The measurement values generated by the sensors may be processed by a processor of the inertial measurement unit and/or by the visual odometry part in order to determine the acceleration and/or changes in the velocity. In other words, the inertial measurement unit may include sensors whose measurement values can be used to determine the acceleration, rotation, yaw, and/or changes in the velocity of the inertial measurement unit. The gyroscope may include a microelectromechanical systems (MEMS) gyroscope.

The acceleration, rotation, yaw, and/or changes in the velocity as determined by the inertial measurement unit is output as inertial related data. The inertial measurement unit may be communicatively and/or electronically connected/coupled to the first input port which may be an interface of the drive device for receiving the inertial related data.

The wheel odometry unit is a device for measuring parameters which are indicative of the pose of the vehicle, such as the distance the vehicle travelled, the speed of the vehicle, and/or the inclination of the wheels of the vehicle. The wheel odometry unit may include one or more sensors, such as a sensor for determining the rotation of a wheel of the vehicle, a sensor for determining the inclination of the wheel of the vehicle, and/or a sensor for determining the position of a steering wheel of the vehicle. The measurement values of these parameters gathered by the sensors of the wheel odometry unit can be processed by a processor of the wheel odometry unit and/or by the visual odometry part in order to determine the distance and/or orientation the vehicle has travelled.

The distance and/or orientation the vehicle has travelled is output by the wheel odometry unit as position related data. The wheel odometry unit may be communicatively and/or electronically connected/coupled to the second input port which may be an interface of the drive device for receiving the inertial related data.

The electromagnetic sensor unit may include sensors with which the surroundings of the vehicle can be determined in two or three dimensions. The electromagnetic sensor unit may use electromagnetic radiation in various wavelength ranges, such as an optical (visible) wavelength range and/or a radiofrequency wavelength range (RF), to sense and/or probe the surroundings of the vehicle. The electromagnetic sensor unit may be configured to detect and/or emit electromagnetic radiation in a single wavelength range or a plurality of wavelength ranges. The electromagnetic sensor unit may be sensor unit for detecting and/or emitting electromagnetic radiation. The electromagnetic sensor unit may be considered an electromagnetic radiation sensor unit.

For example, the electromagnetic sensor unit may include a mono-camera and/or a stereo-camera, i.e. two cameras which are spaced apart from each other to obtain a stereo image of the surroundings of the vehicle. The cameras may be still cameras and/or video cameras. A camera may be mechanically movable, for example, by mounting the camera on a rotating and/or tilting a platform.

However, other imaging or scanning techniques using electromagnetic radiation may be used and, thus, form a part of the electromagnetic sensor unit. The optical sensing device may alternatively or additionally include a radar device and/or a light detection and range (LIDAR) device. The LIDAR device may sense objects in the surrounding of the vehicle using lasers. The LIDAR device can include one or more laser sources, a laser scanner, and one or more detectors, among other system components. The radar device can be a system that utilizes radio signals to sense objects within the local environment of the vehicle. In some embodiments, in addition to sensing objects, the radar unit may additionally sense the speed and/or heading of the other objects, such as other vehicles on the road.

The electromagnetic sensor unit is configured to continuously or periodically sense/probe the surroundings of the vehicle such that changes in the surroundings of the vehicle can be detected using the electromagnetic sensor unit. For example, the electromagnetic sensor unit is configured to capture a second image of the surroundings of the vehicles and, at a later point of time, a first image of the surroundings of the vehicles. The first image and the second image may have to the same orientation and position with respect to the vehicle such that differences between the first image and the second image are due to a movement of the vehicle. Preferably, a continuous stream of first image and second images is generated. The time difference between the first image and second image may be in the millisecond range.

The first image and the second image are output by the electromagnetic sensor unit as first image data and second image data, respectively. The first and/or second image data may include the image data from a left and right camera of a stereo camera. More generally, the first and/or second image data include all data which are recorded at a particular point of time by a single or a plurality of sensors of the electromagnetic sensor unit. The first image data refers to the image data that is recorded later compared to the second image data. The first image data can be considered current image data while the second image data can be considered previous image data.

The third input port may be an interface of the drive device for receiving the first image data and the second image data. The first image data and the second image data are data from which the first image and the second image, respectively, can be generated. For example, the first image data and the second image data are an accumulation of data point which can be associated with pixels of the first image and the second image such that the first image and the second image can be reproduced from the first image data and a second image data, respectively.

The visual odometry part is configured to receive the inertial related data, the position related data, the first image data, and the second image data via the first input port, the second input port, and the third input port. The visual odometry part is configured to calculate or compute an estimated pose of the vehicle by analysing the first image data and the second image data. In general, differences between the first image (represented by the first image data) and the second image (represented by the second image data) indicate a movement of the vehicle from which a pose of the vehicle can be estimated.

The visual odometry part can be configured to extract an identical feature point from the first image data and the second image data or, in other words, from the first image and the second image. Feature points (which may also be called key points) relate to characteristic features and/or features of interest in images such as edges, corners, and/or lines of intersection. A translation of a feature point on an image plane between the first image (or first pair of images of a stereo image) and a second image (or second pair of images of a stereo image) is indicative of a movement of the vehicle. Thus, the translation (direction and magnitude) of a feature point on the image plane from the first image and a second image can be used to calculate the direction and/or the velocity of the movement of the vehicle in the real world.

Preferably, a plurality of feature points is extracted and used to calculate the pose of the vehicle. The pose can include a rotation (yaw) and a translation (direction and/or distance) of the vehicle both of which can be represented by a vector. In theory, the plurality of feature points should all result in determination of the same pose of the vehicle. However, due to measurements inaccuracies and/or artefacts, each pair of first and second feature points may result in a (slightly) different pose. In addition, the visual odometry part may associate a first feature point with a second feature point which do not refer to the same real-world feature. In other words, the association of feature points can include errors.

The visual odometry part may be configured to use an average value of the plurality of estimated poses, to reject feature points or association of feature points which are clearly incorrect (for example if they deviate from an average value by a predetermined threshold), and/or other mathematical or statistical means for determine the real value based on a multitude of measurement points. Optionally, the visual odometry part may be configured to use Random sample consensus (RANSAC). RANSAC estimates pose using the associated feature points or keypoints as follows: it first randomly selects a certain number of associated keypoints, and then estimates the relative pose. It would then use this estimated pose and determine the number of keypoint associations that agree (inliers) with this estimated relative pose. This process is repeated until some stoppage criterion, where the relative pose with the largest number of inliers. In summary, RANSAC is a consensus based approach for determining the most likely relative pose based on the largest subset of keypoint associations (assuming largest subset can be found and if largest subset actually corresponds to the correct relative pose).

The visual odometry part can be configured to extract the second feature point (an image of a real-word feature) from the second image data and to search for the identical feature point (an image of the exact same real-word feature) in the first image data; this feature point corresponds to the first feature point. Then, the visual odometry part can be configured to determine a distance and/or orientation between the two feature points identified in the second image data and the first image data. Subsequently, the visual odometry part can be configured to determine a movement of the vehicle based on a pre-stored relationship between the distance and/or orientation in the image data and the movement of the vehicle. In other words, the distance and/or orientation on the image plane between two feature points that are identified in the second image data and the first image data infer (assuming corresponding real-world objects are fixed) that the electromagnetic sensor unit (or vehicle) has moved. In order to compute the relative pose (i.e. the movement of the electromagnetic sensor unit or vehicle), a geometric approach (such as Perspective-n-Point (Pnp) algorithm) and an optimisation approach (minimising reprojection error) can be employed. In both these cases, the 3D real word position of the corresponding 2D features in the image data can be processed, where the first/second 3D point is projected and compared with the second/first feature point.

The visual odometry part can be configured to determine the pose of the vehicle based on the last known location of the vehicle (as determined by the localization unit) and/or compare the estimated pose with a pose estimation based data received from the localization unit.

The localization unit may a satellite transceiver (e.g., a global positioning system (GPS) transceiver) for determining the current position of the vehicle. The current position of the vehicle is processed and/or output as localization data of the vehicle by the localization device. Thus, the current position of the vehicle can be determined based on the localization data. The localization unit may be communicatively and/or electronically connected/coupled to the visual odometry part, for example via a fourth input port of the drive device.

The visual odometry part may include a deep learning solution (e.g., using a deep neural network (DNN), such as a convolutional neural network (CNN)) for autonomous vehicles. The neural network or artificial intelligence (AI) is used to determine the feature points, the movement of the vehicle, and/or the estimated pose of the vehicle. Alternatively or additionally, the visual odometry part may be configured to compute/calculate these parameters using algorithms.

The visual odometry part uses the inertial related data and position related data when calculating/computing the estimated pose. For example, the inertial related data and/or position related data may be used to verify/confirm the estimated pose and/or the estimated movement of the vehicle. Therefore, the accuracy and/or reliability of the estimated pose can be increased.

The control part is not essential for the invention since the control part can be implemented by a known control part for autonomously or semi-autonomously driving the vehicle. The invention can be regarded in providing the estimated pose based on which the control part operates.

The control part is electronically and/or communicatively connected or coupled to the visual odometry part in order to receive the estimated pose. The control part may be a section or functional unit of the computer described above. The control part is configured to generate signals for controlling a steering device, a throttle device (also referred to as an acceleration device), and a braking device for driving the vehicle on the driveable road. The steering device, the throttle device, and the braking device may be part of a control device for navigating the vehicle.

The steering device can be part of the vehicle to adjust the direction or heading of the vehicle. The throttle device may also be a part of the vehicle to control the speed of the motor or engine that in turn control the speed and acceleration of the vehicle. The braking device can be part of the vehicle to decelerate the vehicle by providing friction to slow the wheels or tires of the vehicle. The steering device, the throttle device and/or the breaking device may be controlled based on the signals output by the control part.

The control part may execute algorithms and/or include a neural network (AI) for navigating the vehicle based on the information on the estimated pose.

The drive device may be part of the vehicle and is electronically and/or communicatively connected to or coupled to the inertial measurement unit, the wheel odometry unit, the electromagnetic sensor unit by the first input port, the second input port, and the third input port, respectively. In other words, the inertial measurement unit outputs inertial related data which are input to the drive device via the first input port; the wheel odometry part output position related data which are input to the drive device via the second input port; and the electromagnetic sensor outputs image data that are input into the drive device via the third input port.

In an optional embodiment, the visual odometry part includes a feature generation and association part configured to generate the first feature point and the second feature point and associates the first feature point with the second feature point, and wherein optionally the visual odometry part further includes a feature point rejection part configured to project a first projected feature point from the second feature point by using a rotation data and a translation data that are computed based on the inertial related data and the position related data, and to calculate a pixel distance between the first feature point and the first projected feature point to evaluate a certainty of an association of the first feature point with the second feature point.

The above-described identification of the first feature point and the second feature point may be executed by the feature generation and association part which can be a section or a functional unit of the computer described above. In detail, the feature generation and association part is configured to identify the closest real-world feature and/or the exact same real-world feature in both the first image data and the second image data and associate the first feature point and second feature point in the first image data and the second image data, respectively, in that they refer to the same real-world feature.

The feature generation and association part may be configured to calculate a pixel distance between the first feature point and the second feature point. The pixel distance is a distance in pixels from the position of the first feature point in the first image to a position of the second feature point at the corresponding pixel position in the second image. The pixel distance is used to assess the association of the first feature point and the second feature point.

The feature point rejection part can be a section or a functional unit of the computer described above. The feature point rejection part may be configured to calculate/compute the first projected feature point based on the corresponding second feature point, the inertial related data, and position related data. The feature point rejection part may be configured to calculate/compute a movement of the vehicle between the time point when the second image data is generated at the time point when first image data is generated based on the inertial related data and position related data. Both types of data are indicative of the movement of the vehicle such that the movement of the vehicle can be determined based on these two types of data. The movement of the vehicle can be expressed in a translation (expressed by translation data) and/or a rotation/yaw (expressed by rotation data).

The feature point rejection part can be configured to transform the movement of the vehicle into a pixel distance and to add the pixel distance to the second feature point to obtain the projected first feature point.

The feature point rejection part may execute algorithms and/or include a neural network (AI) calculate/compute the movement of the vehicle, the corresponding pixel distance and/or the projected first feature point.

For example, the position of the first projected feature point $x_{predicted}^{left}$ may be calculated based on the following formula:

$$x_{predicted}^{left} = KR_{IMU}K^{-1}x_{previous}^{left} + K\frac{t_{WO}}{z_{previous}^{depth}}$$

whereby $t_{WO}$ is the translation (the translation calculated/computed based on the inertial related data and position related data and, thus, an example of translation data), $z_{previous}^{depth}$ is the depth (or distance) of the position of real-world feature corresponding to the second feature point (determined based on the second image data), K is the camera projection matrix which provides a projection of real world distances into pixel distances, $R_{IMU}$ is the rotation or yaw (the rotation calculated/computed based on the inertial related data and position related data and, thus, an example of rotation data), and $x_{previous}^{left}$ is the position of the second feature point in a second image data.

$z_{previous}^{depth}$ is a distance that may be measured parallel to the translation of the vehicle two. For example, if the vehicle drives straight, the direction of the depth is straight forward. $z_{previous}^{depth}$ may be the distance between the camera and the position of the point in the real-world that corresponds to the second feature point. $z_{previous}^{depth}$ may be a depth numerical number, while $x_{previous}^{left}$, $x_{previous}^{left}$, $R_{IMU}$, and/or $t_{WO}$ can be vectors.

The camera projection matrix K may be unique to the vehicle and can be determined by calculating a projection using a known position of a feature in the image data and the known position of the corresponding real-world feature. If the coordinate system of the electromagnetic sensor unit is different to the coordinate system of the vehicle, a transformation between these two coordinate systems needs to be added to the above equation (for example using a further transformation matrix).

The feature point rejection part may calculate a pixel distance between the first feature point and the first projected feature point in order to establish a level of confidence whether the association between the first feature point and the second feature point reflects a true pose of the vehicle. Thus, the pixel distance between the first feature point and the first projected feature point can be used to assess whether the association between the first feature point and the second feature point was correct i.e. the first feature point and the second feature point refer to the same real-world feature.

For example, the feature point rejection part may employ statistical methods to evaluate whether the pixel distance between the first feature point and the projected first feature point indicates that the association between the first feature point and the second feature point reflects a true pose of the vehicle. Optionally, the feature point rejection part rejects the first feature point if the pixel distance between the first feature point and the projected first feature point is greater than a variance of the statistical distribution of all pixel distances between all first feature points and the projected first feature points.

The feature point rejection part may determine the certainty of the association of the first feature point with the second feature point. This certainty may include assigning a level of confidence how likely that the estimated pose calculated based on the association of the first feature point with the second feature point reflects the true pose. For example, the certainty is a level of confidence that is a (mathematical) function of the pixel distance. The certainty or level of confidence may be the higher, the smaller the pixel distance is. The certainty may be used to weight a particular association of a first feature point with a second feature point in the calculation of the estimated pose.

The certainty or level of confidence may also be used to accept or reject the association of first feature point with the second feature point. For example, if the certainty is below a (predetermined) threshold, the association is rejected, otherwise accepted.

In an optional embodiment, the feature point rejection part is configured to reject the association of first feature point with the second feature point if the pixel distance is larger than a predetermined value.

In this optional embodiment, the pixel distance itself is the measure on which it is determined whether to accept or reject the association of first feature point with the second feature point. In other words, the certainty is directly linked to the pixel distance.

The association of the first feature points with the corresponding second feature points that are not rejected are used for calculating/computing the estimated pose in conjunction with the corresponding second feature points. The rejection of the association may include that both the first feature point and the second feature point, only the first feature point, or only the second feature point are rejected.

The feature point rejection part may calculate a Euclidean distance between the first feature point and the projected first feature point. The predetermined value may be a fixed value or may be set based on parameters, such as the expected translation $t_{WO}$ and/or the expected rotation $R_{IMU}$. For example, there may be a linear relationship or other forms of relationships between the predetermined value and the expected translation $t_{WO}$ and/or the expected rotation $R_{IMU}$.

If the first feature point is rejected, the pair of first feature point and the second feature point may not be used for calculating the estimated pose. Other pairs of first feature point and the second feature point which fulfil the predetermined threshold requirement may be used for calculating the estimated pose.

This is method for rejecting outliers in the pairs of first feature points and second feature points. Thus, the non-rejected pairs of first feature points and second feature points provide a more accurate and more reliable prediction of the pose of the vehicle. In particular, this method for rejecting outliers works for the near field as well as for the far field of the electromagnetic sensor unit, i.e. for real world objects that are close and far away of the electromagnetic sensor unit.

In an optional embodiment, the visual odometry part further includes a world point rejection part configured to compare a physical distance in depth between the first feature point and the second feature point with an expected physical distance in depth, wherein optionally the expected physical distance is calculated based on the position related data from the wheel odometry unit.

The world point rejection part may be a section or functional unit of the computer described above. The physical distance refers to a real-world distance, i.e. a distance that can be measured in the real world. This is in contrast to the pixel distance which is a distance that can be measured in the image or image data generated by the electromagnetic sensor unit. The depth may correspond to the z-coordinate of world point vector—a vector connecting $t_{WO}$ points in the real world. The z-coordinate may be the coordinate in coordinate system of the vehicle that points to the front of the vehicle, i.e. in the driving direction if the vehicle is driving straight. As discussed above, the depth may parallel to the translation of the vehicle $t_{WO}$ if the vehicle drives straight, i.e. the rotation of the vehicle is zero.

The camera coordinate frame or, in general, the coordinate frame of the electromagnetic sensor unit can be arbitrarily arranged with respect to the vehicle coordinate frame. As an example, the camera could be placed looking behind the vehicle or looking at the sides. In addition, the coordinate system of the electromagnetic sensor unit can be angled to the coordinate system of the vehicle. A transformation of the camera coordinate frame (or frame of the electromagnetic sensor unit) to the vehicle coordinate frame may be needed.

The x-coordinate in the vehicle coordinate system may extend in the vertical direction, while the y-coordinate in the vehicle coordinate system may extend in the vertical direction, for example to the right when looking in the z-direction.

In this embodiment, the electromagnetic sensor unit needs to include a sensor or a plurality of sensors with which the depth of the imaged surroundings can be determined. This is necessary to calculate the depth for example using triangulation methods. A stereo camera may be used for calculating a depth arranged using triangulation methods. Alternatively, the depth may be directly derivable from LiDAR measurements, or by using multiple cameras in order to compute depth.

The world point rejection part may be configured to convert a the association of the first feature point with the second feature point into a physical distance. The world point rejection part may include algorithms or a neural network (AI) which can convert information on the translation of the first feature point with respect to the second feature point in the image coordinate system in physical distances. Alternatively or additionally, the feature point projection part may be configured to convert the pixel position of the first feature point and the second feature point (i.e. the positions of the first feature point and the second feature point in the first image data and a second image data) into the corresponding positions in the real world, for example in the coordinate system of the vehicle or of the electromagnetic sensor unit (e.g. the camera or other sensors). To this end, the world point rejection part may use the inverse of the camera projection matrix K. The world point rejection part may include algorithms or a neural network (AI) which can convert pixel positions into real world positions. The world point rejection part may then calculate or compute the real-world distance or physical distance from the calculated real-world positions. Finally, the world point rejection part may calculate the physical distance in depth (or the z-component of the physical distance) from the calculated physical distance or physical translation.

The expected physical distance may be calculated using the position related data from the wheel odometry unit. The world point rejection part may include algorithms and/or a neural network (AI) which can calculate/compute the expected physical distance from the position related data. Finally, the world point rejection part may calculate the expected physical distance in depth (or the z-component of the expected physical distance) from the calculated expected physical distance or the expected or physical translation.

The comparison between the physical distance in depth and the expected physical in distance in depth can be used to reject outliers in the past of first feature points and second feature points. The remaining or non-rejected pairs of first feature points and second feature points are used to calculate or compute the estimated pose. Since outliers are rejected, the estimated pose is more accurate and/or more reliable. This method for rejecting outliners is especially accurate in the near field of the electromagnetic sensor unit.

In an optional embodiment, the world point rejection part is configured to calculate an upper bound of the expected physical distance and a lower bound of the expected physical distance and accepts the association of the first feature point and the second feature point if the physical distance in depth is between the upper bound of the expected physical distance and the lower bound of the expected physical distance.

The world point rejection part may include algorithms and/or a neural network (AI) which can calculate/compute the upper bound and/or the lower bound. The upper bound and/or the lower bound may be fixed or predetermined values. Alternatively, the upper bound and/or the lower bound may be variable and can depend on other parameters such as the translation $t_{WO}$ and/or the rotation $R_{IMU}$. Preferably, the upper bound and/or the lower bound depend only on the translation $t_{WO}$ which may be calculated based on the position related data as for example described above.

The lower bound and/or the upper bound may be a function of the translation $t_{WO}$ and/or the rotation $R_{IMU}$, preferably only of the translation $t_{WO}$. The function may be a linear quadratic or other forms of function which link the lower bound and/or the upper bound to the translation $t_{WO}$ and/or the rotation $R_{IMU}$.

If the physical distance in depth is within the boundaries set by the upper bound and the lower bound, the physical distance is expected to accurately and/or reliably be representative of the actual physical distance. With this method, the expected physical distance is used to determine the upper bound and the lower bound which are used for assessing the accuracy of the physical distance in depth. If the physical distance in depth considered accurate, the corresponding pair of first feature point and the second feature point are used for calculating the estimated pose.

This embodiment may be summarised by the following equation:

$$z_{previous}^{left} - z_{current}^{left} < UB(t_{WO})$$

$$z_{previous}^{left} - z_{current}^{left} > LB(t_{WO})$$

$UB(t_{WO})$ and $LB(t_{WO})$ are functions of the expected physical distance or expected left physical translation $t_{WO}$. $z_{previous}^{left}$ and $z_{current}^{left}$ are the physical distance in which are calculated based on the second feature point $x_{previous}^{left}$ (in the second image data) and the first feature point $x_{current}^{left}$ (in the first image data), respectively.

In an optional embodiment, the estimated pose includes an estimated rotation and an estimated translation, and wherein optionally the visual odometry part includes a decision rules part configured to create an expected rotation and an expected translation that are calculated based on the inertial related data from the inertial measurement unit and the position related data from the wheel odometry unit and to evaluate the estimated rotation and the estimated translation based on the expected rotation and the expected translation.

The estimated pose may be calculated as described above, i.e. outliers in pairs of first feature points and second feature points can be rejected and not used for calculating the estimated pose. However, it is also possible that all pairs of first feature points and second feature points are used for calculating the estimated pose.

In this embodiment, the final estimated pose is evaluated in view of an expected pose. In the embodiment described above, pairs of first feature points and second feature points are assessed in order to determine the final estimated pose. This means, the embodiment described above refers to a selection of data, whereas this embodiment relates to the assessment of the final estimated pose.

The visual odometry part may be configured to calculate the expected rotation and/or the expected translation. The estimated rotation and/or the estimated translation may be calculated or computed using both the inertial related data and the position related data. However, it is also possible that the expected rotation is calculated or computed solely based on the inertial related data and/or the expected translation is calculated or computed solely based on the position related data. To this end, the visual odometry part may execute algorithms and/or include a neural network (AI) which can determine the expected rotation and/or the expected translation based on the inertial related data and/or the position related data.

The decision rules part may be configured to evaluate the estimated pose based on the expected pose. Alternatively, the decision rules part may be configured to evaluate estimated translation based on the expected translation and/or the estimated rotation based on the expected rotation. The decision rules part may use statistical methods or any other methods for the evaluation of the estimated pose. The evaluation can encompass the rejection or correction of the estimated pose, the estimated translation, and/or the estimated rotation in view of the as the expected pose, the expected translation, and/or the expected rotation. Alternatively, the evaluation may include an assessment of the accuracy of the estimated pose, for example by associating a statistical value to the estimated pose indicating how true the estimated pose is considered to be.

In an optional embodiment, the expected translation includes an upper bound of the expected translation and a lower bound of the expected translation, wherein optionally the expected rotation includes an upper bound of the expected rotation and a lower bound of the expected rotation, and wherein further optionally the decision rules part is configured to accept the estimated pose if the estimated translation is between the upper bound and the lower bound of the expected translations in case that the vehicle is on a straight road, or to accept the estimated pose if the estimated translation is between the upper bound and the lower bound of the expected translations and the estimated rotation is between the upper bound and the lower bound of the expected rotations in case that the vehicle is on a curve road.

The upper bound of the expected translation and/or the lower bound of the expected translation may be fixed or predetermined values. Alternatively, the upper bound of the expected translation and/or the lower bound of the expected translation can be functions of the expected translation and/or the expected rotation. Similarly, the upper bound of the expected rotation and/or the lower bound of the expected rotation can be functions of the expected translation and/or the expected rotation. Preferably, the upper bound of the expected translation and/or the lower bound of the expected translation are functions of the expected translation and/or the upper bound of the expected rotation and/or the lower bound of the expected rotation are functions of the expected rotation. Instead of the functions between the upper/lower bounds and the expected translation/rotation, other types of relationships may be employed such as a table.

If the vehicle is driving in a straight line, it is detected that the vehicle drives on a straight road, and/or it is detected that the steering angle is equal to zero, it is assumed that there is no rotation present. In this case, the decision rules part solely refers to the translation. In other words, the decision rules part solely evaluates the estimated pose in view of the expected translation such as whether or not the estimated translation is between the upper bound and the lower bound of the expected translation.

If the vehicle is not driving in a straight line, it is detected that the vehicle drives on a curved road, and/or it is detected that the steering angle is not equal to zero, it is assumed that there is rotation. In this case, the decision rules part refers to both the translation and the rotation. In other words, the decision rules part evaluates the estimated pose in view of both the expected translation and the expected rotation. For example, the decision rules part evaluates both whether or not the estimated translation is between the upper bound and the lower bound of the expected translation and whether or not the estimated rotation is between the upper bound and the lower bound of the expected rotation.

If these conditions are fulfilled, the rules decision part accepts the estimated pose such that it can be used for navigating the vehicle. The accepted estimated pose may be forwarded to the drive device. If however these conditions are not fulfilled, the rules decision part rejects the estimated pose.

If the electromagnetic sensor unit includes different type of sensors, the above-described method for evaluating the estimated pose may be extended to all these different types of sensors. This means, the estimated pose may be calculated based on the image data generated by the first type of sensor (e.g. a stereo camera), a second type of sensor (e.g. a LiDAR device), and/or a third type of sensor (e.g. a radar device).

Thus, various estimated poses may be calculated and evaluated in view of the expected pose as described above. The various estimated poses that that have been accepted in the above describes evaluation process may be combined to achieve a single estimated pose. The combination of the various estimated poses may be done using an extended Kalman filtering fusion module. Kalman filtering also known as linear quadratic estimation (LQE) is a known filtering technique for combining different values in statistics and control theory.

A computer-implemented method for driving vehicle in an automated mode and/or driving assistance mode, comprises the steps of:
 a) outputting inertial related data by an inertial measurement unit,
 b) outputting position related data by a wheel odometry unit, and
 c) outputting first image data and second image data by an electromagnetic sensor unit, the second image data being previous image data of the first image data, and
 d) receiving, by a visual odometry part, the inertial related data, the position related data, the first image data, and the second image data and outputting an estimated pose of the vehicle computed by associating a first feature point extracted from the first image data with a second feature point extracted from the second image data and evaluating the association of first feature point and second feature point based on the inertial related data from the inertial measurement unit and the position related data from wheel odometry.

Optionally, the method additionally includes the step of driving, by a control part, the vehicle in an automated driving mode and/or assisted driving mode based on the estimated pose.

The above comments, remarks and optional embodiments of the drive device and the vehicle equally apply to the computer-implemented method for driving vehicle in an automated mode and/or driving assistance mode. The method may be executed by a computer which executes the functionalities of the drivable road detection part, the image based drivable road detection part, the fusing part, and/or the control part.

A drive device for automated driving and/or assisted driving of a vehicle comprises a first input port, a second input port, a third input port, and a visual odometry part. The first input port is configured to receive inertial related data measured by an inertial measurement unit. The second input port is configured to receive position related data measured by a wheel odometry unit. The third input port is configured to receive first image data (or set of first image data) and second image data (or set of first image data) by an electromagnetic sensor unit, the second image data being previous image data of the first image data. The visual odometry part is configured to receive the inertial related data, the position related data, the first image data, and the second image data and to output an estimated pose of the vehicle that is calculated based on the inertial related data and the position related data, the estimated pose includes an estimated rotation and an estimated translation. The visual odometry part includes a decision rules part configured to create an expected rotation and an expected translation that are calculated based on the inertial data from the inertial measurement unit and the position related data from the wheel odometry unit and evaluates the estimated rotation and the estimated translation based on the expected rotation and the expected translation.

Optionally, the drive device may include a control part configured to generate driving signals for automated driving and/or assisted driving based on the estimated pose.

The above comments, remarks and optional embodiments of the drive device and the vehicle equally apply, in particular to the decision rules part.

A vehicle comprises an inertial measurement unit configured to output inertial related data, a wheel odometry unit configured to output position related data, an electromagnetic sensor unit configured to output first image data and second image data that is previous image data of the first image data, and a visual odometry part. The visual odometry part is configured to receive the inertial related data, the position related data, the first image data, and the second image data and to output an estimated pose of the vehicle that is calculated based on the inertial related data and the position related data, the estimated pose includes an estimated rotation and an estimated translation. The visual odometry part includes a decision rules part configured to create an expected rotation and an expected translation that are calculated based on the inertial data from the inertial measurement unit and the position related data from the wheel odometry unit and evaluates the estimated rotation and the estimated translation based on the expected rotation and the expected translation.

Optionally, the vehicle may include a control part configured to drive the vehicle in an automated driving mode and/or assisted driving mode based on the estimated pose.

In an optional embodiment, the expected translation includes an upper bound of the expected translation and a lower bound of the expected translation, wherein optionally the expected rotation includes an upper bound of the expected rotation and a lower bound of the expected rotation, and wherein further optionally the decision rules part is configured to accept the estimated pose if the estimated translation is between the upper bound and the lower bound of the expected translation in case that the vehicle is on a straight road, or to accept the estimated pose if the estimated translation is between the upper bound and the lower bound of the expected translation and the estimated rotation is between the upper bound and the lower bound of the expected rotation in case that the vehicle is on a curve road.

A computer-implemented method for driving vehicle in an automated mode and/or driving assistance mode, comprises the steps of:
a) outputting inertial related data by an inertial measurement unit,
b) outputting position related data by a wheel odometry unit, and
c) outputting first image data and second image data by an electromagnetic sensor unit, the second image data being previous image data of the first image data, and
d) receiving, by a visual odometry part, the inertial related data, the position related data, the first image data, and the second image data and outputting an estimated pose of the vehicle that is calculated based on the inertial related data and the position related data, the estimated pose includes an estimated rotation and an estimated translation.

The step of outputting the estimated pose includes creating, by a decision rules part, an expected rotation and an expected translation that are calculated based on the inertial data from the inertial measurement unit and the position related data from the wheel odometry unit and evaluates the estimated rotation and the estimated translation based on the expected rotation and the expected translation.

Optionally, the method additionally includes the step of driving, by a control part, the vehicle in an automated driving mode and/or assisted driving mode based on the estimated pose.

The invention further refers to a computer program comprising instructions which, when the program is executed by a computer, cause the computer to carry out the steps of the methods describe above.

The invention also refers to a computer-readable storage medium comprising instructions which, when executed by a computer, cause the computer to carry out the steps of the methods described above.

Optional embodiments of the invention will be discussed in conjunction with the accompanying drawings. Therein,

DESCRIPTION OF EMBODIMENTS

Figure 1:
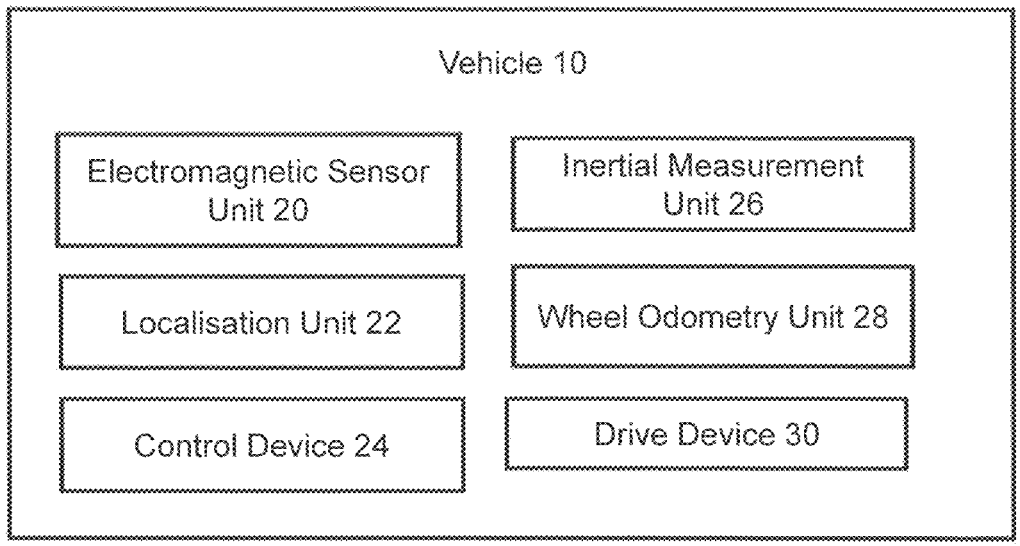
FIG. 1 shows a block diagram of a vehicle.
Figure 2:
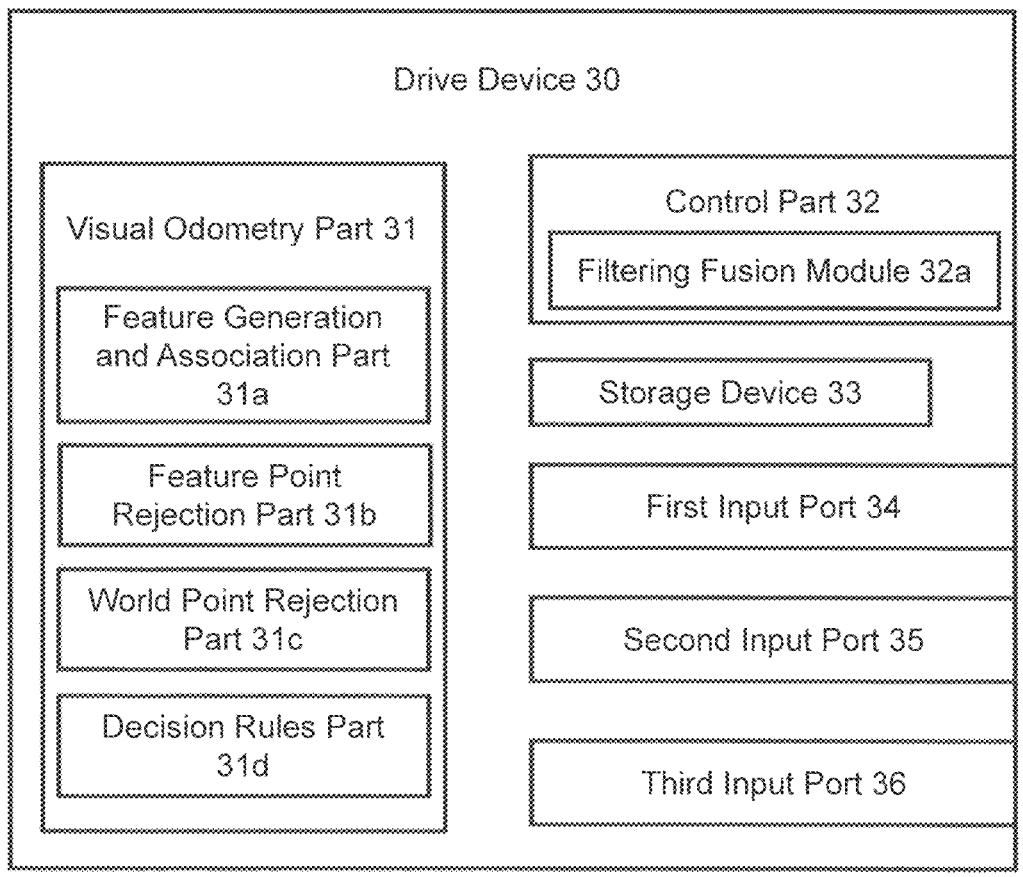
FIG. 2 shows a block diagram of a drive device of the vehicle according to FIG. 1.

FIG. 1 shows a vehicle 10 which can any kind of self-propelled automobile and is preferably configured to drive on a road. For example, the vehicle 10 comprises an engine and/or an electric motor for driving wheels of the vehicle 10.

The vehicle 10 includes an electromagnetic sensor unit 20, a localization unit 22, a control device 24, an inertial measurement unit 26, a wheel odometry unit 28, and/or a drive device 30. The electromagnetic sensor unit 20, the localization unit 22, the control device 24, the inertial measurement unit 26, the wheel odometry unit 28, and/or the drive device 30 are communicatively and/or electronically connected to each other in order to exchange data or other types of information.

The electromagnetic sensor unit 20 may include one or more cameras, a LIDAR device, and/or a radar device. The camera may optionally be a stereo camera. The electromagnetic sensor unit 20 is capable of imaging the surroundings of the vehicle 10. In particular, the electromagnetic sensor unit 20 is configured to provide a 3D representation of the surroundings of the vehicle 10.

The electromagnetic sensor unit 20 outputs the representation of the surroundings of the vehicle 10 as image data. The electromagnetic sensor unit 20 optionally is configured to periodically and/or continuously image to surroundings of the vehicle 10. Thus, the electromagnetic sensor unit 20 is configured to output a plurality of image data whereby each image data is taken at a different point of time. First image data may be taken at a later point of time compared to second image data. The electromagnetic sensor unit 20 is configured to image the same (angular) section of the surroundings in a coordinate system of the vehicle 10. The electromagnetic sensor unit 20 may be statically arranged on the vehicle 10.

The localization unit 22 may be a device for determining the position of the vehicle 10. The localization unit 22 can be a GPS (Global Positioning System) transceiver.

The localization unit 22 is configured to output the position of the vehicle 10 as localization data.

The control device 24 includes components of the vehicle 10 which can be controlled for driving or navigating the vehicle 10. The control device 24 may include a steering device, a throttle device (also referred to as an acceleration device), and braking device for driving the vehicle 10 on the driveable road.

The steering device can be part of the vehicle 10 to adjust the direction or heading of the vehicle 10. The throttle device may also be a part of the vehicle 10 to control the speed of the motor or engine that in turn control the speed and acceleration of the vehicle 10. The braking device can be part of the vehicle 10 to decelerate the vehicle 10 by providing friction to slow the wheels or tires of the vehicle 10. The steering device, the throttle device and the breaking device may be controlled based on the signals output by a control part.

The inertial measurement unit 26 is a device for measuring forces to which the inertial measurement unit 26 is subjected, such as accelerations, rotations (yaws), and/or changes in the velocity. The inertial measurement unit 26 may be fixedly attached to the vehicle 10. If so, the inertial measurement unit 26 is configured to measure accelerations, rotations (yaws), and/or changes in the velocity of the vehicle 10. The inertial measurement unit 26 outputs the measured values as inertial related data.

The inertial measurement unit 26 may include one or more sensors, such as an accelerometer, a gyroscope (gyrometer), and/or a magnetometer. The inertial measurement unit 26 includes sensors whose measurement values can be used to determine the acceleration, rotations (yaws), and/or changes in the velocity of the vehicle 10. The gyroscope may include a microelectromechanical systems (MEMS) gyroscope.

The wheel odometry unit 28 is a device for measuring parameters which are indicative of the movement of the vehicle 10, such as the distance the vehicle 10 travelled, the speed of the vehicle 10, and/or the inclination of the wheels of the vehicle 10. The wheel odometry unit 28 includes one or more sensors, such as a sensor for determining the rotation of a wheel of the vehicle 10, a sensor for determining the inclination of the wheel of the vehicle 10, and/or a sensor for determining the position of a steering wheel of the vehicle 10. The wheel odometry unit 28 outputs the measured values as position related data.

The drive device 30 can be considered a computer or computer system including a plurality of processors (not shown in the figures) and a storage device 33. The drive device 30 is configured to execute a plurality of algorithms which may be stored in the storage device 33. The plurality of algorithms processed by the drive device 30 allow to autonomously or semi-autonomously navigate the vehicle 10. The drive device 30 may be considered an autopilot and/or a drive assistance system of the vehicle 10.

To this end, the drive device 30 can perform various functionalities which can be associated to a visual odometry part 31 and/or a control part 32. Each of these parts can be considered a section or functional unit of the drive device 30 which executes algorithms to achieve the autonomous or semi-autonomous navigation of the vehicle 10. Therefore, the parts 31 and/or 32 can be considered implementations of a computer software.

The algorithms for the parts 31 and/or 32 can be stored in the storage device 33. The drive device 30 can receive the inertial related data from the inertial measurement unit 26 via a first input port 34. Similarly, the drive device 30 can receive the position related data from the wheel odometry unit 28 via a second input port 35. The drive device 30 can receive the image data from the electromagnetic sensor unit 20 via a third input port 36. In addition, the drive device 30 can receive the localization data from the localization unit 22 via fourth input port (not shown in the figures).

The first input port 34, the second input port 35, and the third input port 36 can be considered interfaces which allow communication of the drive device 30 with the inertial measurement unit 26, the wheel odometry unit 28, and the electromagnetic sensor unit 20, respectively.

The visual odometry part 31 can include a feature generation and association part 31a, an feature point rejection part 31b, a world point rejection part 31c, and/or a decision rules part 31d. Each of these parts can be considered a section or functional unit of the visual odometry part 31. The algorithms for the parts 31a, 31b, 31c, and/or 31d can be stored in the storage device 33.

The feature generation and association part 31a receives the first image data and the second image data and identifies or extract a first feature point (or first keypoint) in the first image data and a second feature point (or second keypoint) in the second feature data. This can be done by identifying or extracting the second feature point in the second image data and, subsequently, by searching for the same feature point in the first image data. Alternatively, the feature generation association part 31a searches for the feature points in the first image data and for the feature points in a second feature data and, subsequently, associates corresponding feature points, i.e. feature points which correspond to the same real-world feature. Preferably, the feature generation and association part 31a extract a plurality of pairs of first feature points and second feature points. The feature generation and association part 31a may include a neural network (AI) or other types of algorithms for associating the first feature points and the second feature points.

Due to the movement of the vehicle 10, the first feature point can be at a different pixel position compared to the second feature point. This pixel difference corresponds to a movement of the vehicle 10. Thus, the visual odometry part 31 can extract the movement of the vehicle 10 and/or the pose of the vehicle 10 from the first image data and a second image data. For example, the visual odometry part 31 includes a neural network (AI) or other types of algorithms for calculating or computing the estimated pose based on the association of the plurality of pairs of first feature points and second feature points. In particular, the visual odometry part 31 can calculate or compute an estimated translation and an estimated rotation of the vehicle 10 which form the estimated pose of the vehicle 10.

In theory, the information on the translation of the first feature point with respect to the second feature point in the image coordinate system for each pair of first feature points and second feature points would result in the same estimation of the movement of the vehicle 10 and/or the pose of the vehicle 10. In practice, the estimations of the movement of the vehicle 10 and/or the pose of the vehicle 10 differ for each pair of first feature points and second feature points. One way of increasing the accuracy and/or the position of the estimated pose is to reject pairs of first feature points and second feature points which are not indicative of the real pose of the vehicle 10.

In a first embodiment, the feature point rejection part 31b calculates a pixel distance between the pixel position of the feature point and the pixel position of the second feature point (the converse argument would also work for the first feature point). For example, the pixel position is calculated by using the pixel coordinates corresponding to the pixel positions of the first feature point and a second feature point. This step is repeated for each pair of first feature point and second feature point.

The feature point rejection part 31b can also project a first projected feature point based on the second feature point by using the inertial related data and the position related data. The inertial related data and the position are used to calculate rotation data indicating a rotation of the vehicle 10 and translation data indicating a translation of the vehicle 10. To this end, the feature point rejection part 31b may include a neural network (AI) or other types of algorithms which can calculate or compute the rotation data and the translation data from the inertial related data and/or the position related data. For example, a function and/or table links the rotation data and the translation data to the inertial related data and/or the position related data.

The rotation data and a translation data describe the movement of the vehicle 10 in a real-world coordinate system. The rotation data and a translation data are then converted into an image coordinate system by the feature point rejection part 31b. This can be done by a neural network (AI) or other types of algorithms. For example, a camera projection matrix K can be used. As a result, the movement of the vehicle 10 is converted into a movement of the feature point in the image. In other words, a real-world distance/vector corresponding to the movement of the vehicle 10 is converted into a pixel distance/vector. Thus, it is possible to predict the movement of a feature point. The prediction of the second feature point results in the first projected feature point.

The following formula may be used for calculating the first projected feature point left $x_{predicted}^{left}$.

$$x_{predicted}^{left} = KR_{IMU}K^{-1}x_{previous}^{left} + K\frac{t_{WO}}{z_{previous}^{depth}}$$

whereby $t_{WO}$ is the translation (the translation calculated/computed based on the inertial related data and position related data and, thus, an example of translation data), $z_{previous}^{depth}$ is the depth (or position) of the position of real-world feature corresponding to the second feature point (determined based on the second image data), K is the camera projection matrix which provides a projection of real world distances into pixel distances, $R_{IMU}$ is the rotation (the rotation calculated/computed based on the inertial related data and position related data and, thus, an example of left rotation data), and $x_{previous}^{left}$ is the position of the second feature point in a second image data.

$z_{previous}^{depth}$ is a distance that may be measured parallel to the translation $t_{WO}$ of the vehicle 10. For example, if the vehicle 10 drives straight, the direction of the depth is depth straight forward. $z_{previous}^{depth}$ may be the distance between the camera and the position of depth the point in the real-world that corresponds to the second feature point. $z_{previous}^{depth}$ may be a numerical number, while $x_{previous}^{left}$, $x_{predicted}^{left}$, $R_{IMU}$, and $t_{WO}$ are vectors.

If the coordinate system of the electromagnetic sensor unit 20 is different to the coordinate system of the vehicle 10, a transformation between these $t_{WO}$ coordinate systems needs to be added to the above equation (for example using a further transformation matrix).

The feature generation and association part 31a calculates the pixel distance between the first projected feature point $x_{predicted}^{left}$ and the first feature point $x_{current}^{left}$. The pixel distance may be a Euclidian distance in the image coordinate system or image plane.

If this pixel distance is above a certain threshold, the pair of associated first feature point and second feature point is rejected and does not contribute to the calculation of the estimated pose. Pairs of associated first feature points and second feature points with which the pixel distance between the first feature point the first feature point at the first projected feature point is below the threshold, are used to calculate the estimated pose. Thus, with this method, it is possible to exclude pairs of feature points which unlikely to be not representative of the true movement of the vehicle 10 from the calculation of the estimated pose. In addition, it is possible to reject pairs of first feature points and second feature points with which the association was not correct, i.e. the first feature point and the second feature point do not relate to the same real-world feature.

Figure 5:
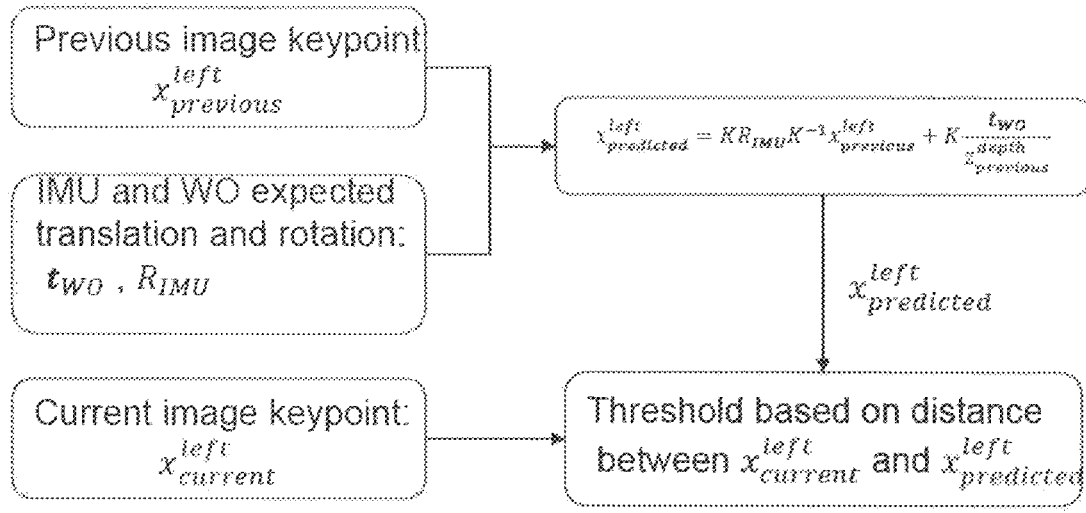
FIG. 5 shows a flow diagram illustrating steps of outlier rejection of FIG. 4.

The functioning of the feature point rejection part 31b is also depicted in the flow diagram of FIG. 5. This method works in the coordinate system of the images since it uses pixel distances. This way of rejecting outliers of the first feature points and the second feature points works in the near field and the far field of the electromagnetic sensor unit 20.

In a second embodiment, the world point rejection part 31c reject outliers in the pairs of first feature points and second feature points in a real-world coordinate system, for example the coordinate system of the vehicle 10. To this end, the world point rejection part 31c calculates a physical distance in depth between the first feature point and the second feature point. This can be done by calculating a distance between the first feature point and the second feature point as outlined above and, then, transforming the calculated distance in a real-world or physical distance. Alternatively, the world point rejection part 31c transforms the first feature point and the second feature point into corresponding real-world positions and, subsequently, calculates the physical distance with respect to the real-world positions. The transformation from the pixel coordinate system to the real-world coordinate system may be executed by the world point rejection part 31c using a neural network (AI) or deterministic algorithms. For example, the inverse of the camera projection matrix K and stereo disparity estimation can be used.

The depth of the physical may correspond to the z-coordinate of connecting two points in the real world. The z-coordinate may be the coordinate in coordinate system of the vehicle 10 that points to the front of the vehicle 10, i.e. in the driving direction if the vehicle 10 is driving straight. The depth may parallel to the translation $t_{WO}$ of the vehicle 10 if the vehicle 10 drives straight, i.e. the rotation of the vehicle 10 is zero.

The world point rejection part 31c also calculates an upper bound UB ($t_{WO}$) and a lower bound LB($t_{WO}$) which can be functions of the translation $t_{WO}$ of the vehicle 10. For example, there is a linear, exponential, and/or power-law relationship between the translation $t_{WO}$ of the vehicle 10 and the upper bound UB($t_{WO}$) and the lower bound LB($t_{WO}$). Alternatively, the world point rejection part 31c may include a table which links the translation $t_{WO}$ of the vehicle 10 to the upper bound $UB(t_{WO})$ and the lower bound $LB(t_{WO})$. The translation $t_{WO}$ of the vehicle 10 corresponds to the expected physical distance the vehicle 10 is expected to travel which is calculated using the position related data from the wheel odometry unit 28. To this end, the world point rejection part 31*c* includes a neural network (AI) and/or (deterministic) algorithms which link the position related data to the expected physical distance—the translation $t_{WO}$.

The world point rejection part 31*c* reject the pair of first feature point and second feature point if the physical distance in depth of the first feature point and the second feature point is not within the range between the upper bound UB $(t_{WO})$ and the lower bound $LB(t_{WO})$. This can be summarised by the following equations:

$$z^{left}_{previous} - z^{left}_{current} < UB(t_{WO})$$

$$z^{left}_{previous} - z^{left}_{current} > LB(t_{WO})$$

$t_{WO}$ is the expected physical distance. $z^{left}_{previous}$ and $z^{left}_{current}$ are the physical distance in depth which are calculated based on the second feature point $x^{left}_{previous}$ and the first feature point $x^{left}_{current}$, respectively.

Figure 6:
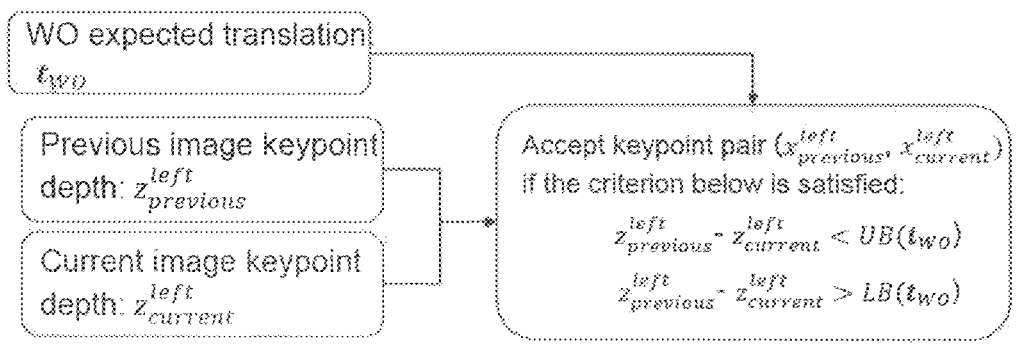
FIG. 6 shows a flow diagram illustrating steps of keypoint or feature point rejection of FIG. 4.

The functioning of the world point rejection part 31*c* is also depicted in the flow diagram of FIG. 6. This method works in the coordinate system of the vehicle 10 or in the real-world coordinate system since it uses physical distances. This way of rejecting outliers of the first feature points and the second feature points works particularly well in the near field of the electromagnetic sensor unit 20.

The decision rules part 31*d* does not refer to the rejection of pairs of first feature points and second feature points but relates to the assessment of the estimated pose which is calculated on the plurality of first feature points and second feature points as described above. The decision rules part 31*d* is configured to calculate or compute an expected pose which can include an expected rotation and/or an expected translation. The expected pose is determined based on the inertial related data and/or the position related data whereas the estimated pose is determined based on the image data. The decision rules part 31*d* may include a neural network (AI) and/or (deterministic) algorithms which allow to calculate the expected rotation and/or the expected translation based on the position related data and/or inertial related data. Preferably, the expected rotation is calculated using the inertial related data and/or the expected translation is calculated using position related data.

The decision rules part 31*d* is further configured to calculate or compute an upper bound and a lower bound for both the expected rotation $R_{IMU}$ and the expected translation $t_{WO}$. Thus, decision rules part 31*d* calculates an upper bound $UB(t_{WO})$ and a lower bound $LB(t_{WO})$ for the translation and an upper bound $UB(R_{IMU})$ and a lower bound $LB(R_{IMU})$ for the rotation. The upper bounds and the lower bounds may be determined using a (mathematical) function and/or tables which link the upper bounds and the lower bounds to the expected rotation $R_{IMU}$ and the expected translation $t_{WO}$.

If the vehicle 10 drives on a straight road or is detected that the steering angle is zero, the estimated pose is accepted if the following equations are fulfilled:

$$t_{VO} < UB(t_{WO})$$

$$t_{VO} > LB(t_{WO})$$

Thereby, $t_{VO}$ is the estimated translation which can be calculated based on the image data as described above.

If the vehicle 10 drives on a curved road or is detected that the steering angle is not equal to zero, the estimated pose is accepted if the following equations are fulfilled:

$$t_{VO} < UB(t_{WO})$$

$$t_{VO} > LB(t_{WO})$$

$$R_{VO} < UB(R_{IMU})$$

$$R_{VO} > LB(R_{IMU})$$

Thereby, $R_{VO}$ is the estimated rotation which can be calculated based on the image data as described above.

Figure 7:
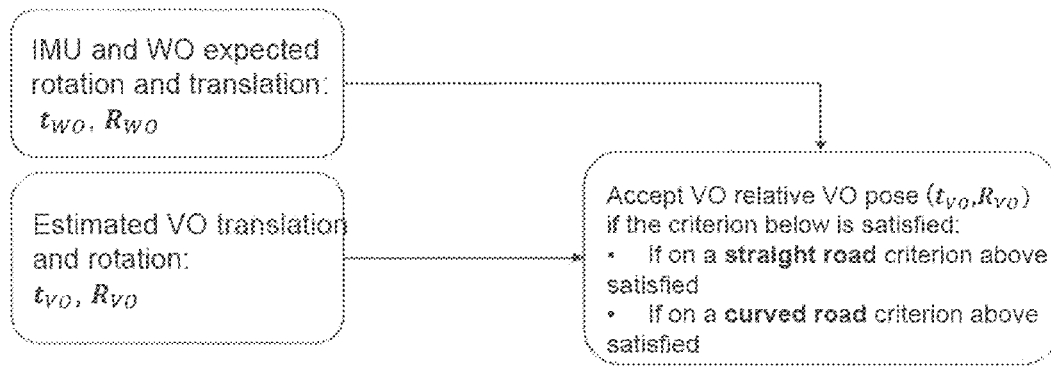
FIG. 7 shows a flow diagram illustrating steps of decision rules of FIG. 4.

The decision rules part 31*d* thus evaluates the estimated pose and not individual pairs of first feature points and second feature points. The method according to which the decision rules part 31*d* operates is also depicted in the flow diagram of FIG. 7.

The decision rules part 31*d* evaluates the estimated poses which are determined using the image data from different sensors of the electromagnetic sensor unit 20. This means, each sensor of the electromagnetic sensor unit 20 generates image data which is used to calculate an estimated pose using the methods outlined above. The decision rules part 31*d* accepts each estimated pose from different sensors of the electromagnetic sensor unit 20 if they fulfil the equations outlined above.

Figure 8:
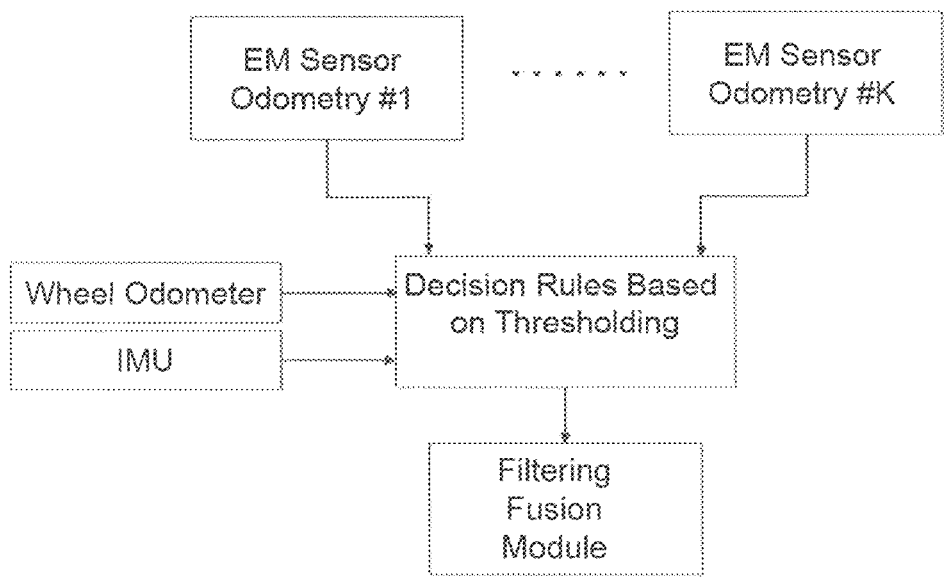
FIG. 8 shows a flow diagram illustrating an extension of the steps of FIG. 7.

A filtering fusion module 32*a* combines or fuses the plurality of estimated poses that are accepted by the decision rules part 31. Thus, filtering fusion module 32*a* generates a single estimated pose which includes the information of all the estimated poses that are accepted by the decision rules part 31. The filtering fusion module 32*a* may include a Kalman filter for fusing the plurality of estimated poses that are accepted by the decision rules part 31. This method is also depicted in the flow diagram of FIG. 8.

The control part 32 may include known neural networks or other types of known artificial intelligence (AI) to generate driving signals for navigating the vehicle 10 based on the estimated pose that is output by the visual odometry part 31 or by the filtering fusion module 32*a*. The driving system may be used for automated driving and/or assisted driving (semi-automated driving). The control part 32 can include an output port for out putting driving signals to the control device 24 which controls the steering device, the throttle device, and/or the braking device based on the driving signals.

Figure 3:
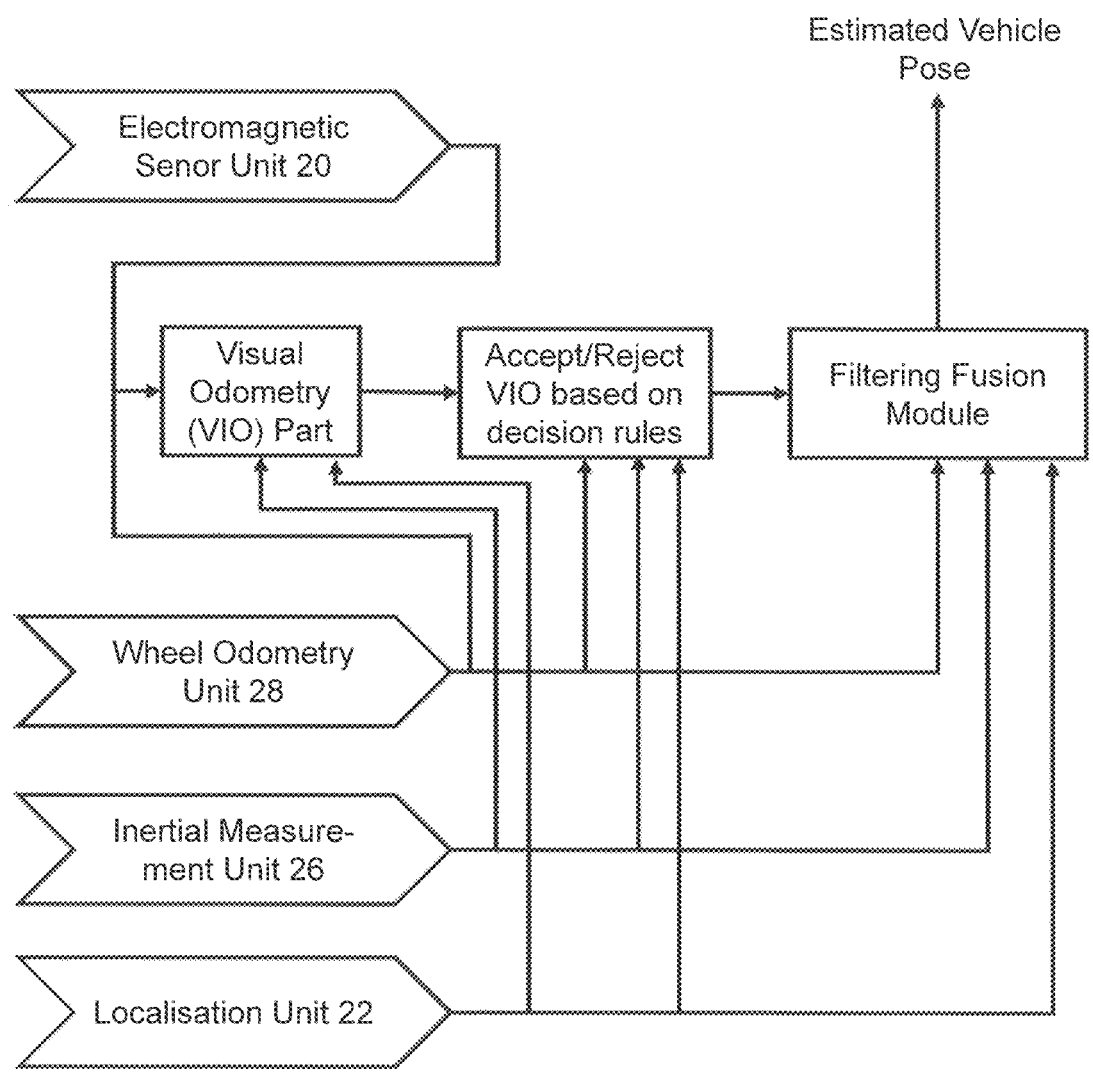
FIG. 3 shows a flow diagram depicting the basic functionalities of the drive device according to FIG. 2.
Figure 4:
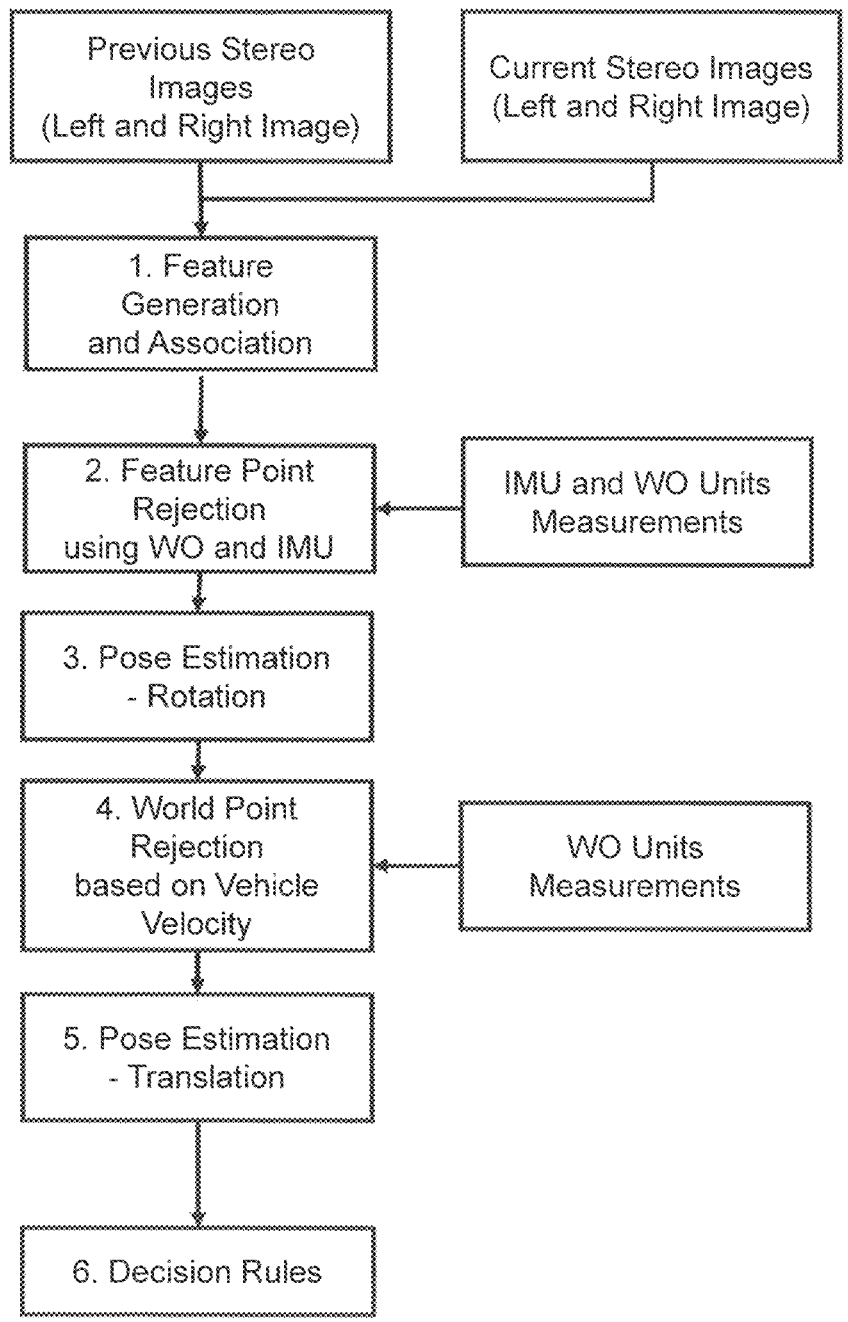
FIG. 4 shows a flow diagram illustrating steps of the functionalities of the drive device according to FIG. 3.

A method for autonomously and/or semi-autonomously navigating a vehicle 10 will be described in conjunction with FIG. 3.

The electromagnetic sensor unit 20 outputs image data which the visual odometry part 31 process is to obtain an estimated pose of the vehicle 10 which include an estimated translation and an estimated rotation. Details of this process are described above and are known in field. In order to increase the precision and accuracy of the estimated pose, the visual odometry part 31 also processes inertial related data output by the inertial measurement unit 26 and position related data output by the wheel odometry unit 28. The position related data and the inertial related data are used to reject feature points or key features in the image data. The rejected feature points considered to be not representative of the estimated pose. This means, the feature points that are used for determining the estimated pose are evaluated in view of data that is generated by other means for demining the pose of the vehicle 10—the inertial measurement unit 26 and the wheel odometry unit 28. As described above, the rejection of outliers of feature points can be done both in the coordinate system of the image data and in real-world coordinate system. What is more, localization data from the localization unit 22 may also be used for evaluating the estimated pose. For example, the localization data may be used to calculate an expected translation and expected rotation which can be fed into the evaluation process similar to the evaluation of the estimated pose based on the expected translation and expected rotation generated using the inertial related data and the position related data.

In a subsequent step, the estimated pose is either accepted or rejected based on the expected pose. In details, a range for which the estimated pose is accepted is determined in view of the expected pose as described above. In contrast to the step described above, the estimated pose itself is accepted or rejected and not values contributing to the calculation of the estimated pose. Here again, localization data from the localization unit 22 may be used for accepting or rejecting the estimated pose—a expected pose may be calculated based on the localization data. The acceptance or rejection of the estimated pose can be done for each estimated pose that is calculated from different sensors of the electromagnetic sensor unit 20. In other words, for each sensor of the electromagnetic sensor unit 20, an estimated pose is calculated and accepted if it is within the boundaries set in view of the expected pose.

In the last step, the plurality of accepted estimated poses is combined using a Kalman filter. The expected rotation and the expected translation as well as the localization data may also be inputs to the Kalman filter. A single estimated pose is the result of the Kalman filtering process.

In a final optional step, the vehicle 10 is navigated based on single estimated pose.

The invention claimed is:

1. A drive device for at least one of automated driving or assisted driving of a vehicle, comprising
    a first input receiver configured to receive inertial related data measured by an inertial measurement generator,
    a second input receiver configured to receive position related data measured by a wheel odometry generator,
    a third input receiver configured to receive first image data associated with a first timestep and second image data associated with a second timestep from an electromagnetic sensor data generator, the second timestep being before the first timestep,
    a visual odometry generator configured to;
        receive the inertial related data, the position related data, the first image data, and the second image data; and
        determine an estimated pose of the vehicle by associating a first feature point extracted from the first image data with a second feature point extracted from the second image data and evaluating the association of the first feature point and the second feature point based on the inertial related data and the position related data, and
    a controller configured to generate driving signals for the vehicle in the at least one of automated driving or assisted driving based on the estimated pose,
    wherein the visual odometry generator further includes a world point evaluator configured to compare a physical distance in depth between the first feature point and the second feature point with an expected physical distance in depth, the expected physical distance being calculated based on the position related data to determine whether to accept the association of the first feature point and the second feature point.

2. A vehicle comprising:
    an inertial measurement generator configured to output inertial related data,
    a wheel odometry generator configured to output position related data,
    an electromagnetic sensor data generator configured to output first image data associated with a first time step and second image data associated with a second timestep that is before the first timestep,
    a visual odometry generator configured to:
        receive the inertial related data, the position related data, the first image data, and the second image data; and
        determine an estimated pose of the vehicle by associating a first feature point extracted from the first image data with a second feature point extracted from the second image data and evaluating the association of the first feature point and the second feature point based on the inertial related data and the position related data, and
    a controller configured to drive the vehicle in at least one of an automated driving mode or assisted driving mode based on the estimated pose,
    wherein the visual odometry generator further includes a world point evaluator configured to compare a physical distance in depth between the first feature point and the second feature point with an expected physical distance in depth, the expected physical distance being calculated based on the position related data to determine whether to accept the association of the first feature point and the second feature point.

3. The drive device according to claim 1, wherein the visual odometry generator includes
    a feature generator configured to generate the first feature point and the second feature point and associate the first feature point with the second feature point, and
    a feature point evaluator configured to:
        compute, based on the inertial related data and the position related data, rotation data and translation data;
        project a first projected feature point from the second feature point using the rotation data and the translation data; and
        calculate a pixel distance between the first feature point and the first projected feature point to evaluate a certainty of an association of the first feature point with the second feature point.

4. The drive device according to claim 3, wherein the feature point evaluator is configured to reject the association of the first feature point with the second feature point if the pixel distance is larger than a predetermined value.

5. The drive device according to claim 1, wherein the world point evaluator is configured to:
    calculate an upper bound of the expected physical distance and a lower bound of the expected physical distance; and
    accept the association of the first feature point and the second feature point if the physical distance in depth is between the upper bound of the expected physical distance and the lower bound of the expected physical distance.

6. The drive device according to claim 1, wherein the estimated pose includes an estimated rotation and an estimated translation, and
wherein the visual odometry generator includes a decision evaluator configured to:
generate an expected rotation and an expected translation based on the inertial related data and the position related data; and
evaluate the estimated rotation and the estimated translation based on the expected rotation and the expected translation.

7. The drive device according to claim 6, wherein the expected translation includes an upper bound of the expected translation and a lower bound of the expected translation,
wherein the expected rotation includes an upper bound of the expected rotation and a lower bound of the expected rotation, and
wherein the decision evaluator is configured to:
accept the estimated pose if the estimated translation is between the upper bound and the lower bound of the expected translations in case that the vehicle is on a straight road, or
to accept the estimated pose if the estimated translation is between the upper bound and the lower bound of the expected translations and the estimated rotation is between the upper bound and the lower bound of the expected rotations in case that the vehicle is on a curve road.

8. A computer-implemented method for driving a vehicle in at least one of an automated mode or driving assistance mode, comprising:
outputting, by an inertial measurement generator, inertial related data,
outputting, by a wheel odometry generator, position related data,
outputting, by an electromagnetic sensor data generator, first image data associated with a first timestep and second image data associated with a second timestep, the second timestep being before the first timestep,
receiving, by a visual odometry generator, the inertial related data, the position related data, the first image data, and the second image data,
determining an estimated pose of the vehicle by associating a first feature point extracted from the first image data with a second feature point extracted from the second image data and evaluating the association of the first feature point and the second feature point based on the inertial related data and the position related data, and
driving, by a controller, the vehicle in at least one of an automated driving mode or assisted driving mode based on the estimated pose,
wherein the visual odometry generator further includes a world point evaluator configured to compare a physical distance in depth between the first feature point and the second feature point with an expected physical distance in depth, the expected physical distance being calculated based on the position related data to determine whether to accept the association of the first feature point and the second feature point.

9. A drive device for at least one of an automated driving or assisted driving of a vehicle, comprising
a first input receiver configured to receive inertial related data measured by an inertial measurement generator,
a second input receiver configured to receive position related data measured by a wheel odometry generator,
a third input receiver configured to receive first image data associated with a first timestep and second image data associated with a second timestep that is before the first timestep from an electromagnetic sensor data generator,
a visual odometry generator configured to:
receive the inertial related data, the position related data, the first image data, and the second image data, and
determine an estimated pose of the vehicle based on the inertial related data and the position related data, the estimated pose including an estimated rotation including an upper bound and a lower bound and an estimated translation including an upper bound and a lower bound, and
a controller configured to generate driving signals for the vehicle in the at least one of automated driving or assisted driving based on the estimated pose,
wherein the visual odometry generator includes a decision evaluator configured to:
generate an expected rotation and an expected translation based on the inertial data and the position related data, and
evaluate the estimated rotation and the estimated translation based on respective upper bounds and lower bounds of the expected rotation and the expected translation to determine the estimated pose.

10. A vehicle comprising:
an inertial measurement generator configured to output an inertial related data,
a wheel odometry generator configured to output a position related data, an electromagnetic sensor data generator configured to output a first image data associated with a first timestep and a second image data associated with a second timestep that is before the first timestep,
a visual odometry generator configured to:
receive the inertial related data, the position related data, the first image data, and the second image data, and
determine an estimated pose of the vehicle based on the inertial related data and the position related data, the estimated pose including an estimated rotation including an upper bound and a lower bound and an estimated translation including an upper bound and a lower bound, and
a controller configured to drive the vehicle in at least one of an automated driving mode or assisted driving mode based on the estimated pose,
wherein the visual odometry generator includes a decision evaluator configured to;
generate an expected rotation and an expected translation based on the inertial data and the position related data, and
evaluate the estimated rotation and the estimated translation based on respective upper bounds and lower bounds of the expected rotation and the expected translation to determine the estimated pose.

11. The drive device according to claim 9,
wherein the decision evaluator is configured to:
accept the estimated pose if the estimated translation is between the upper bound and the lower bound of the expected translation in case that the vehicle is on a straight road, or
accept the estimated pose if the estimated translation is between the upper bound and the lower bound of the expected translation and the estimated rotation is between the upper bound and the lower bound of the expected rotation in case that the vehicle is on a curve road.

12. A computer-implemented method for driving vehicle in at least one of an automated mode or driving assistance mode, comprising:
   outputting, by an inertial measurement generator, inertial related data,
   outputting, by a wheel odometry generator, position related data it,
      outputting, by an electromagnetic sensor data generator, first image data associated with a first timestep and second image data associated with a second timestep, the second timestep being before the first timestep,
   receiving, by a visual odometry generator, the inertial related data, the position related data, the first image data, and the second image data,
   an estimated pose of the vehicle based on the inertial related data and the position related data, the estimated pose including an estimated rotation including an upper bound and a lower bound and an estimated translation including an upper bound and a lower bound, and
   driving, by a controller, the vehicle in the at least one of an automated driving mode or assisted driving mode based on the estimated pose,
   wherein outputting the estimated pose includes:
      generating, by a decision evaluator, an expected rotation and an expected translation based on the inertial data and the position related data, and
      evaluating the estimated rotation and the estimated translation based on respective upper bounds and lower bounds of the expected rotation and the expected translation to determine the estimated pose.

* * * * *